(12) United States Patent
Whinney (10) Patent No.: US 9,644,604 B2
(45) Date of Patent: May 9, 2017

(54) VERTICAL AXIS TURBINE (71) Applicant: SuperVAWT Limited, Calne, Wiltshire (GB)

(72) Inventor: James Frederick Carnac Whinney, Calne (GB)

(73) Assignee: SUPERVAWT LIMITED, Wiltshire (GB)

(*) Notice: Subject to any disclaimer, the term of this patent is extended or adjusted under 35 U.S.C. 154(b) by 0 days.

(21) Appl. No.: 14/646,897

(22) PCT Filed: Nov. 26, 2013

(86) PCT No.: PCT/EP2013/074704
§ 371 (c)(1),
(2) Date: May 22, 2015

(87) PCT Pub. No.: WO2014/080030
PCT Pub. Date: May 30, 2014

(65) Prior Publication Data
US 2015/0292481 A1 Oct. 15, 2015

(30) Foreign Application Priority Data

Nov. 26, 2012 (GB) .................................. 1221260.1

(51) Int. Cl.
F03D 3/06 (2006.01)
F03D 7/06 (2006.01)

(52) U.S. Cl.
CPC .............. *F03D 3/068* (2013.01); *F03D 7/06* (2013.01); *F05B 2260/75* (2013.01); *Y02E 10/28* (2013.01); *Y02E 10/38* (2013.01); *Y02E 10/74* (2013.01)

(58) Field of Classification Search
CPC ......... F03D 3/068; F03D 7/06; F05B 2260/75
See application file for complete search history.

(56) References Cited

U.S. PATENT DOCUMENTS 1,639,545 A * 8/1927 Weaver ................... F03D 3/068
416/41
3,382,931 A 5/1968 Dejussieu et al.
(Continued)

FOREIGN PATENT DOCUMENTS

| DE | 202010002046 U1 | 6/2011 |
| FR | 2924182 A1 | 5/2009 |
| WO | 2004079187 A1 | 9/2004 |
| WO | 2011130797 A1 | 10/2011 |
| WO | 2011144830 A1 | 11/2011 |

OTHER PUBLICATIONS

Notification of Grant for GB1221260.1; Date of Mailing: Feb. 9, 2016, 2 pages.
(Continued)

Primary Examiner — Craig Kim
Assistant Examiner — Eldon Brockman
(74) Attorney, Agent, or Firm — Fredrikson & Byron, P.A.

(57) ABSTRACT

A vertical axis wind turbine including a turbine rotor having an axis of rotation and at least one blade spaced from and mounted for rotation about the rotation axis of the turbine. The blade has at least one longitudinal surface substantially parallel to the rotation axis and for engagement, in use, with wind incident on the turbine rotor. The blade is a two part blade with a first leading blade portion pivotably connected to a second trailing blade portion. The turbine includes pitch control means and camber control means for controlling the pitch and camber of the blade.

27 Claims, 13 Drawing Sheets (56) References Cited

U.S. PATENT DOCUMENTS

| | | | |
|---|---|---|---|
| 4,383,801 A | 5/1983 | Pryor | |
| 4,619,585 A * | 10/1986 | Storm | F03D 7/06 416/119 |
| 5,193,978 A | 3/1993 | Gutierrez | |
| 5,324,164 A | 6/1994 | Doering et al. | |
| 5,503,525 A * | 4/1996 | Brown | F03D 3/068 415/4.4 |
| 2008/0042445 A1 | 2/2008 | Stephens | |
| 2008/0258469 A1 | 10/2008 | Stephens et al. | |
| 2010/0054936 A1 | 3/2010 | Sneeringer | |
| 2010/0096854 A1 | 4/2010 | Paluszek et al. | |
| 2010/0181777 A1 | 7/2010 | Grigg | |
| 2011/0006526 A1 | 1/2011 | Hemmingsson | |
| 2011/0305569 A1 | 12/2011 | Kim | |

OTHER PUBLICATIONS

Examination Report under Section 18(3) for GB1221260.1; Date of Report: May 29, 2015, 1 page.
Examination Report under Section 18(3) for GB1221260.1; Date of Report: Oct. 5, 2015, 1 page.
Search Report of UK Pat. App. No. GB1221260.1, (corresponding to the instant application), dated Mar. 18, 2013, 3 pages, Intellectual Property Office, London, England.
Examination Report of UK Pat. App. No. GB1221260.1, (corresponding to the instant application), dated May 29, 2015, 1 page, Intellectual Property Office, London, England.
PCT International Search Report and Written Opinion for Intl. App. No. PCT/EP2013/074704, from which the instant application is based, 8 pgs.

* cited by examiner

VERTICAL AXIS TURBINE

RELATED APPLICATIONS

This application is a 35 U.S.C. 371 national stage filing from International Application No. PCT/EP2013/074704, filed Nov. 26, 2013, and claims priority to British Application No. 1221260.1, filed Nov. 26, 2012, the teachings of each of which are incorporated herein by reference.

FIELD OF THE INVENTION

The present invention is concerned with a turbine for use as a wind turbine. The invention is concerned with turbines having a turbine rotor with an axis of rotation and including a blade spaced from the rotation axis of the turbine and in which the longitudinal axis of the blade is substantially parallel to the axis of rotation of the rotor. Embodiments of the invention are particularly advantageous when used as part of a vertical axis wind turbine although the invention is also applicable to water driven turbines such as tidal turbines.

BACKGROUND

Darrieus type vertical axis wind and water turbines are well known (see, for example, US 2011/0006526). Such turbines have a number of known disadvantages which include low efficiency, a lack of starting torque and excessive vibration. In order to overcome some of these disadvantages, a number of turbine arrangements have been proposed which have mechanisms for adjusting the pitch of the blades of the turbine. The Darrieus turbines have not been as efficient or effective as expected. This is thought to be due to the physical stresses and limitations imposed by a practical design and real wind conditions (which are unlikely to be consistent). Furthermore, it is difficult to make a Darrieus turbine self-starting.

A number of arrangements have been proposed for improving the performance of Darrieus or vertical axis wind turbines.

The angle of attack is the angle between the direction of an oncoming fluid and a reference line on an aerofoil such as a turbine blade. The pitch angle or pitch of an aerofoil such as a wind turbine blade is the angle the aerofoil takes relative to a fixed reference such as the base of the wind turbine, or the horizon. For a wind turbine in wind whose direction is not changing, pitch is a measure of angle of attack. The pitch may also be defined as an angular rotation applied to the root of a blade. It is recognised that the pitch of an aerofoil has an impact on the torque exerted on the aerofoil by an oncoming fluid (e.g. wind on a wind turbine) and hence on the output from a turbine including aerofoil blades. Various arrangements for controlling the pitch of the blades of a vertical axis wind turbine are known. Arrangements such as those disclosed in US 2011/0006526 A1, WO 2011/130797 A1, WO 2011/144830 A1, FR 2 924 182 A1, U.S. Pat. No. 3,382,931 A1 and WO 201/0305569 A1 aim to control the pitch of the blades of a vertical axis wind turbine using a cam arrangement whereby a centrally located cam is provided and a cam follower coupled to the blades follows the cam and thereby pivots the blade as it moves around the turbine's axis of rotation.

WO 2011/130797 discloses a wind turbine with pitch control means in the form of a ring or guide located around the shaft and coupled via links or lines to the trailing end of each blade to control the pitch of each blade during rotation of the turbine rotor. The ring or guide is mounted so that it can itself move as the turbine rotates. The mechanism to allow the ring or guide to move creates a passive control system such that the position of the blades is partially determined by the strength and direction of the wind and thereby at least partially self-adjusting. This arrangement is complicated to make and prone to failure. Passive control systems such as that of WO 2011/130797 also cannot provide control of the camber of the blade.

FR 2 924 182 discloses a wind turbine with a cam arrangement to control pitch. A central irregular cam track is provided around the turbine rotor's axis of rotation and cam followers are connected by arms or links to the blades. The arrangement of a single central irregular cam track with a series of links on cam followers results in a complicated arrangement which vibrates and shakes, and is very difficult to adjust for different wind conditions. The control rods or links connecting the central cam followers to the respective blades are shown as being parallel to the respective support arms. However, those rods or links would need, in use, to pull the blades to angles which are not parallel to the arm. This is likely to lead to high frictional forces and vibration and shaking.

U.S. Pat. No. 3,382,931, US 2011/0006526, WO 2011/144830 and US 2011/0305569 all disclose arrangements similar to the original arrangement proposed by Darrieus in which pitch control is achieved by means of providing links or rods connected to a central pitch control unit such that they rotate about a point eccentrically located relative to the turbine rotor's axis of rotation. Such arrangements also suffer from excessive vibration and hence losses.

The inventor of the subject application has appreciated that the arrangements with rigid rods or links connected to a shared central hub or pivot result in strains and vibrations resulting from the fact that opposite sides of the turbine are subject to very different wind conditions and opposing links or rods therefore exert different forces and give rise to imbalances. Pitch control devices for vertical axis wind turbines have had no commercial success. There have been many designs and, of the available test data, none have been promising. There have been problems with vibration, friction and poor performance, which the existing and known arrangements have not sufficiently resolved.

Although variable pitch appears to be an answer to the large variations in the angle of attack of a vertical axis wind turbine during each revolution of the turbine (and the resultant significant fluctuations in dynamic loading that cause fatigue and reduce turbine performance) no successful design has been found. Known vertical axis turbines are therefore not as powerful as they might be and there are fatigue implications in the current vertical axis designs that do not have pitch control.

U.S. Pat. No. 3,382,931, US 2011/0006526, FR 2 924 182, WO 2011/130797 and US 2011/0305569 disclose wind turbines in which blade pitch angle of a number of blades is controlled by rods connecting each blade to a central cam track or a single central bearing which rotates about an axis offset from the turbine blade's axis of rotation. As discussed above, the inventor of the subject application is the first to appreciate that this arrangement of rods extending out to a number of blades from a single central track or bearing results in poor performance. The reasons for the poor performance are not entirely clear but it is believed that it is because, in practice, blades and rods are not perfectly rigid there are inevitably slight changes in the distance between blades as the blades rotate because of differences in the forces at different points in their rotation. These differences lead to vibrations. The faster the rotation and/or wind or fluid speed, the greater these effects will be as the differences in the forces between different points in the rotation become bigger.

The camber of an aerofoil such as a turbine blade is effectively the shape or curvature of the aerofoil. The camber of an aerofoil can be defined by a camber line, which is the curve that is halfway between the upper and lower surfaces of the aerofoil. US 2010/0096854 A1 discloses a vertical axis wind turbine which can be actively controlled. Each blade is in two parts and the pitch and camber of each blade is controlled by motors arranged in or near the blades which controllably move the two parts of each blade and thereby change the blade pitch and camber. This arrangement requires complex data processing to control each motor. Furthermore, the motors need to be powerful and are difficult to control accurately as the forces necessary to move the blade portions as they rotate are significant.

US 2010/0054936 and DE 20 2010 002 046 U also disclose arrangements for controlling the camber (and/or the pitch) of individual wind turbine blades using computer controlled actuators located in or near the turbine blades. As discussed above for US 2010/0096854, in use the blades move quickly and are subject to significant forces. Actuators or motors suitable for controlling the blades must therefore be able to provide very high forces so as to change the angle of attack or pitch, and the shape or camber, of the moving blades. The necessary actuators or motors are therefore expensive and prone to failure. Furthermore, locating the actuators at or near the blades makes maintenance or replacement of the actuators difficult, time-consuming and expensive.

WO 2004/079187 discloses a wind turbine with passive camber guidance. This does not allow for accurate control of camber and hence optimisation of the camber properties at different points in the rotation of the respective blade.

BRIEF SUMMARY OF EMBODIMENTS OF THE INVENTION

The present invention provides a turbine as defined in claim 1 to which reference should now be made. Preferred features of embodiments of the invention are set out in the dependent claims to which reference should also be made.

The inventor of the subject application is the first to appreciate that a solution to the problem of complex and difficult control associated with the systems like that of US 2010/0096854 can be achieved by the counter-intuitive step of controlling camber and pitch using a simple and robust physical or mechanical control rather than a precise and prone to fail electronic control. The inventor is the first to appreciate that a physical or mechanical cam type control arrangement can be used to effectively control both the pitch and camber of a turbine blade and that such control can significantly improve the efficiency of a vertical axis wind turbine.

Embodiments of the invention provide an active control of both pitch and camber by ensuring that the pitch and camber pivots follow paths defined and set by the respective first and second physical components. The first and second physical components defining the pitch and camber paths respectively may be separate components.

A solution used in preferred embodiments of the invention is to separate the control of each blade, but maintain accurate positioning by providing a physical component to define a pitch pivot path. Preferably independent offset eccentric bearings are provided for each blade or the offset bearing is replaced with an offset guide rail. Where an offset guide rail is used, it is no longer necessary to have separate guide rails for each blade, as the guidance mechanism for each blade can be separate during the blades rotation around the guide.

To reduce vibration and improve laminar flow, the blade must be able to alter its camber. A second physical component provides a defined camber pivot path to achieve that and maintain laminar flow around a rotation. Preferably a set of offset eccentric bearings or guide rails provides the second physical path.

Preferably the pitch and camber paths are each substantially circular. The inventor has appreciated that this considerably simplifies construction of the turbine and makes it more easily controllable without significant losses of efficiency and effectiveness. Irregular arrangements, such as that in FR 2 924 182, which are accurately tailored for maximum efficiency cannot be easily adjusted to a different irregular arrangement. They also require a rotating yaw mechanism to align the irregular arrangement with the wind direction.

Preferably the position of the pitch and camber bearings, or the pitch and camber guide rails is controllably adjustable.

Preferably the position of the pitch and camber bearings, or the pitch and camber guide rails is controlled by linear actuators. When the offset eccentric bearings or guides are placed on linear actuators the camber and pitch of the blade can be easily altered to match rotation and wind speeds. If the offset is reversed it can be used to induce blade stall and so safely stop a turbine.

If the offset eccentric bearings or guide rails are mounted on linear actuators that can move them in two axes then they can act together as a yawing mechanism by moving the offset of the bearings or guides to any useful position.

BRIEF DESCRIPTIONS OF DRAWINGS

Embodiments of the present invention will now be described by way of a non-limiting example with reference to the attached figures in which.

DETAILED DESCRIPTION OF EMBODIMENTS OF THE INVENTION

Certain terminology will be used in the following description for convenience and reference only, and will not be limiting. For example, the words "top", "bottom", "lower" and "upper" will refer to directions in the drawings to which reference is being made. Said terminology will include the words specifically mentioned, derivatives thereof, and words of similar import or understood by the skilled man to be functionally the same.

Figure 1:
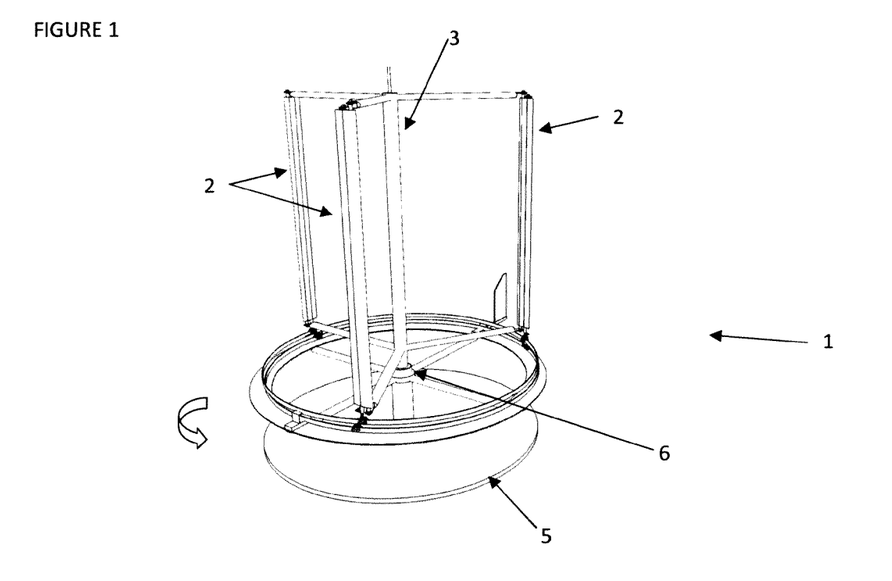
FIG. 1 illustrates a first embodiment of the invention with three turbine blades and two offset guide rails, one guide rail to control the pitch of the blades and one guide rail to control the camber of the blades.
Figure 2:
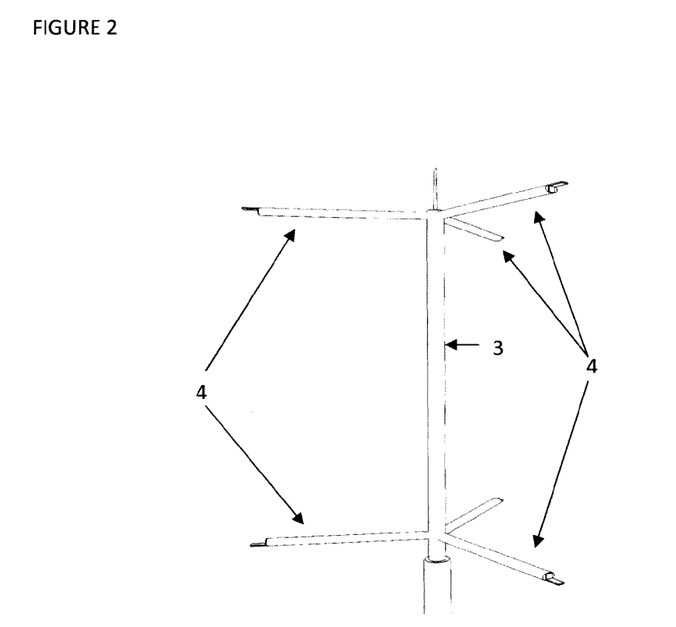
FIG. 2 illustrates the central vertical axis and blade support arms of the embodiment of FIG. 1.
Figure 3:
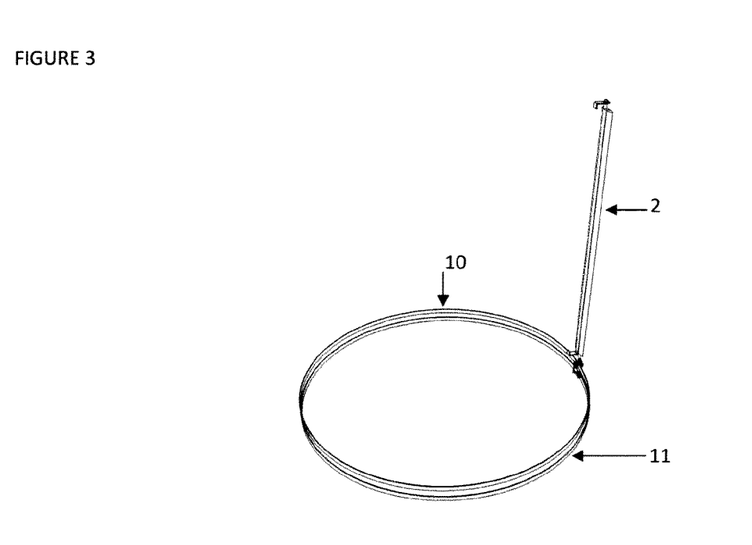
FIG. 3 illustrates a construction of blades and guide rails for the embodiment of FIG. 1.

Referring to FIGS. 1 and 2, a vertical axis wind turbine 1 comprises three turbine blades 2 which rotate around a central vertical rod 3 defining a vertical axis. This vertical rod is coupled to the turbine blades by pairs of arms 4 which connect to the tops and bottoms of each turbine blade 2. The horizontal support arms 4 are rigidly connected to the central vertical rod 3 and the central vertical rod 3 can rotate about a support 5 at its base 6. The central vertical rod 3, horizontal support arms 4 and blades 2 together form the rotor of the vertical axis wind turbine 1.

Each blade has two portions (see FIG. 5); a leading blade portion 7 and a trailing blade portion 8.

The bottom of each blade 9 is coupled to a pair of guide rails 10, 11 which are themselves supported by the base 6 of the wind turbine 1, or otherwise supported and held at the bottom of the vertical axis wind turbine.

Figure 4:
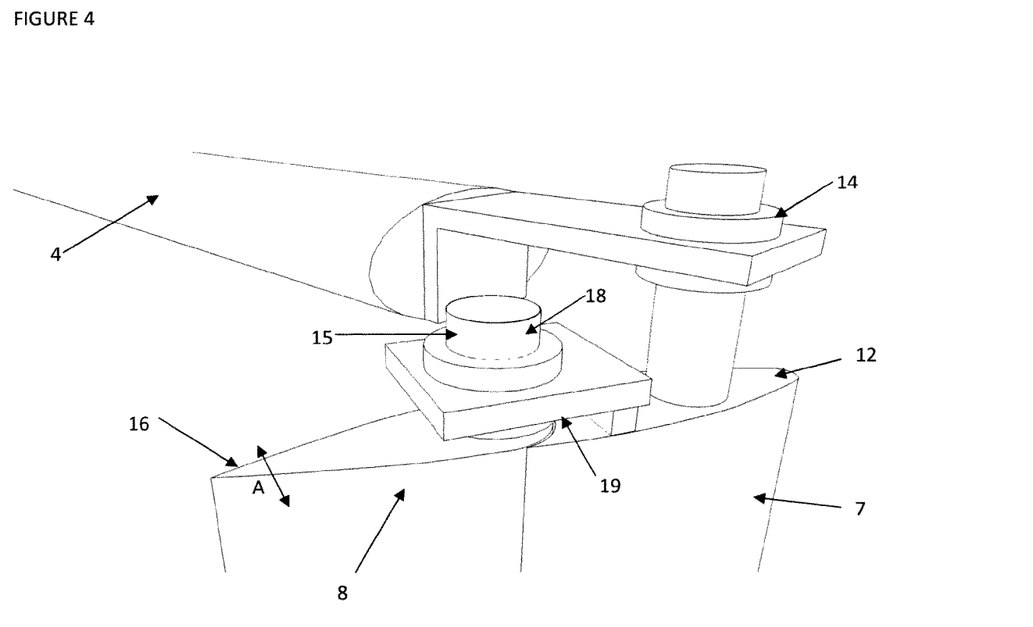
FIG. 4 is a detail view of the top of the blades of FIG. 1.
Figure 5:
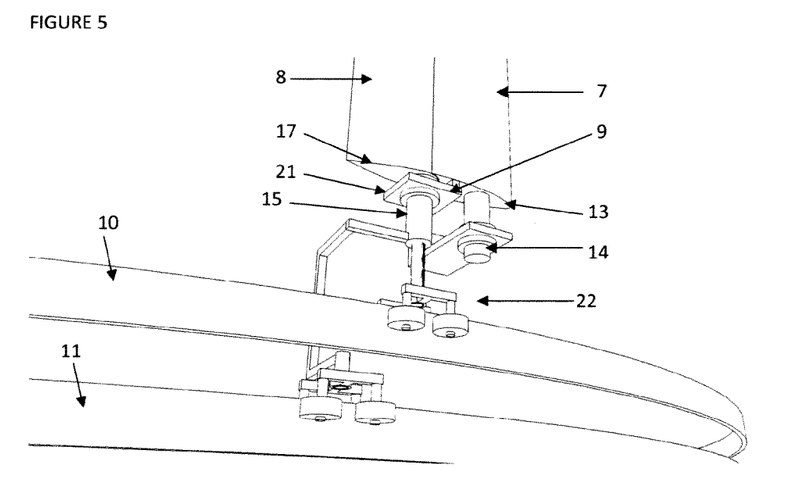
FIG. 5 is a view showing the bottom of the blades of FIG. 1.
Figure 6:
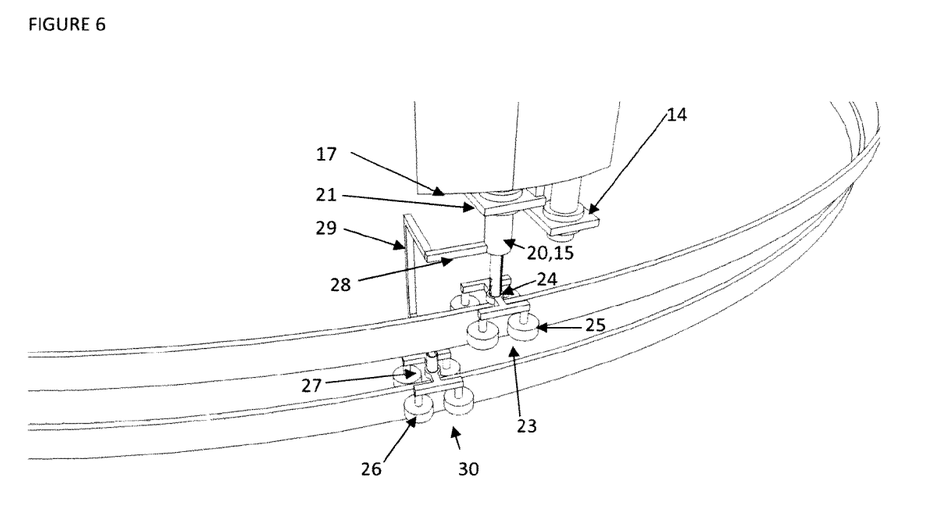
FIG. 6 is an alternative view corresponding to FIG. 5 but at a higher elevation.
Figure 7:
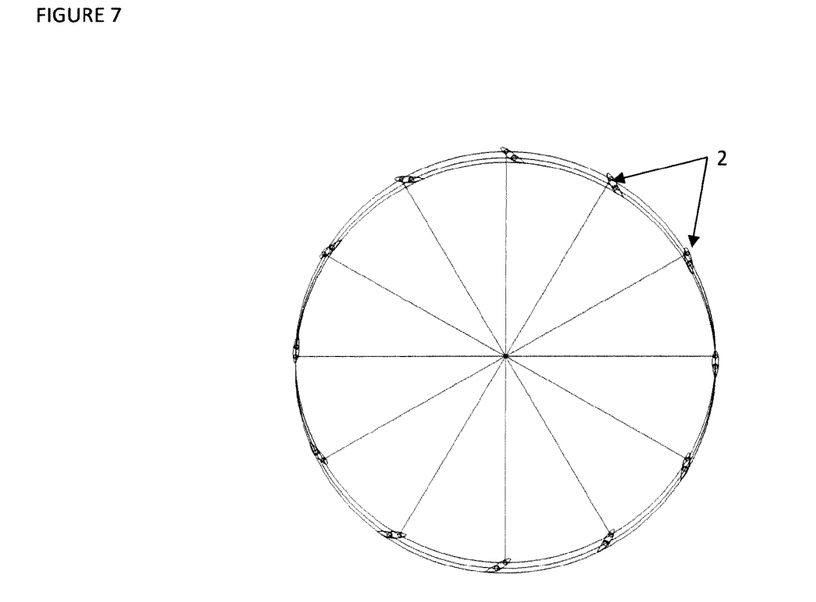
FIG. 7 is a schematic illustration of the control of a blade and its pitch and camber as the blade rotates.
Figure 8:
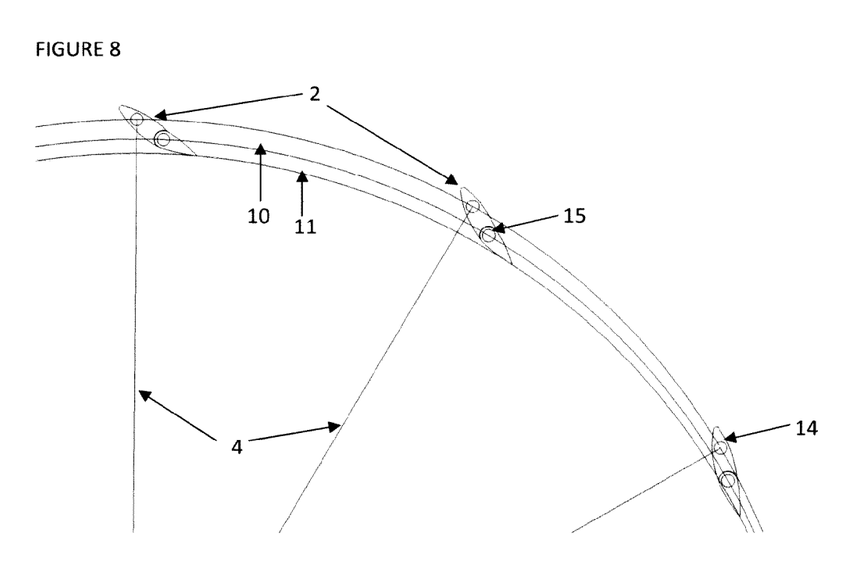
FIG. 8 is a detailed view of a portion of the schematic illustration of FIG. 7.

Referring to FIGS. 4, 5 and 6, the first, leading blade portion 7 contains a rod 15 that projects from the top 12 and bottom 13 ends of the leading blade portion, that is coupled by a bearing arrangement 14 to the horizontal blade support arms. The second, trailing blade portion 8 is arranged so that it can rotate relative to the leading blade portion 7 in the direction 'A' shown in FIG. 4. A rod 15 passes through and is coupled to the front of the trailing blade portion 8 from top 16 to bottom 17. The upper end 18 of this rod 15 is pivotably coupled via a bearing 19 to the front or leading blade portion 7, and at its bottom end 20 is pivotably coupled both to the leading blade portion 7 in a manner similar to that described above for the upper end via a bearing 21, and via a follower bearing 24 to a cam follower arrangement 23 which is coupled to and follows a pitch control guide rail or cam track 10. The cam follower 23 comprises said central bearing 24 to which four rotating bearings 25 are attached. The four bearings are placed around the guide rail 10 which comprises a circular plate-like element. This arrangement means that the pitch or angle of the leading blade portion 7 varies with the radial distance between the ends of the horizontal support arms 4 and the respective portion of the pitch control guide rail 10.

A U-shaped arm 29 is rigidly connected to a connecting arm 28, which in turn is rigidly connected to the bottom end 20 of rod 15. This arm arrangement 28, 29 is used to pivotably couple the bottom end 20 of rod 15, via bearing 27, to a second cam follower 30 which engages a camber controlled guide rail or cam track 11. The camber cam follower is similar to the pitch cam follower in comprising said single central bearing 27 to which four bearings 26 are attached as described above for the pitch cam follower 23. The four bearings 26 are placed around a circular plate-like guide rail 11 which defines the camber guide rail or cam track. The cam follower 30 is mounted on the bottom of the arm arrangement 28, 29 by said central bearing 27. The arm 28, 29 is shaped such that there is room for the guide rails 10, 11 to cross over and the pitch and camber cam followers 23, 30 not to interfere with each other.

The camber guide rail 11 and its interaction with the camber follower bearing 30 results in the control of the pivoting of the trailing blade portion 8 relative to the leading blade portion 7 and thereby controllably change the camber of the blade 2.

Figure 9:
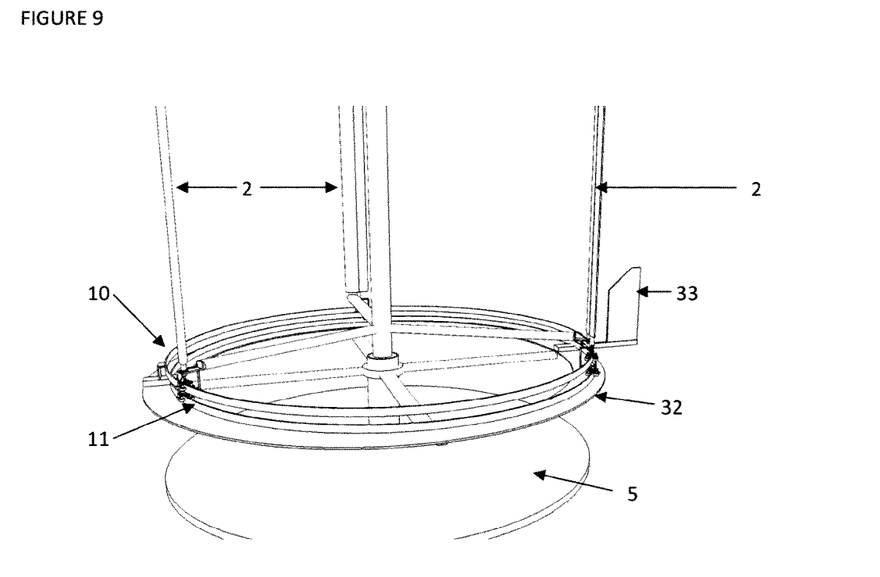
FIG. 9 illustrates a yaw mechanism for the embodiment of FIGS. 1 to 8 described above.
Figure 10:
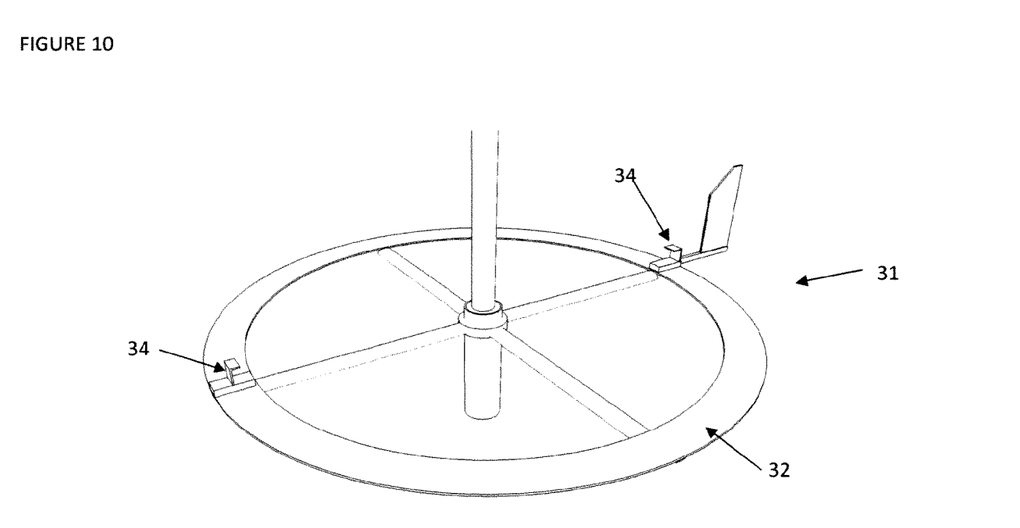
FIG. 10 is an alternative view of the yaw mechanism at FIG. 9 with the guide rails removed.
Figure 11:
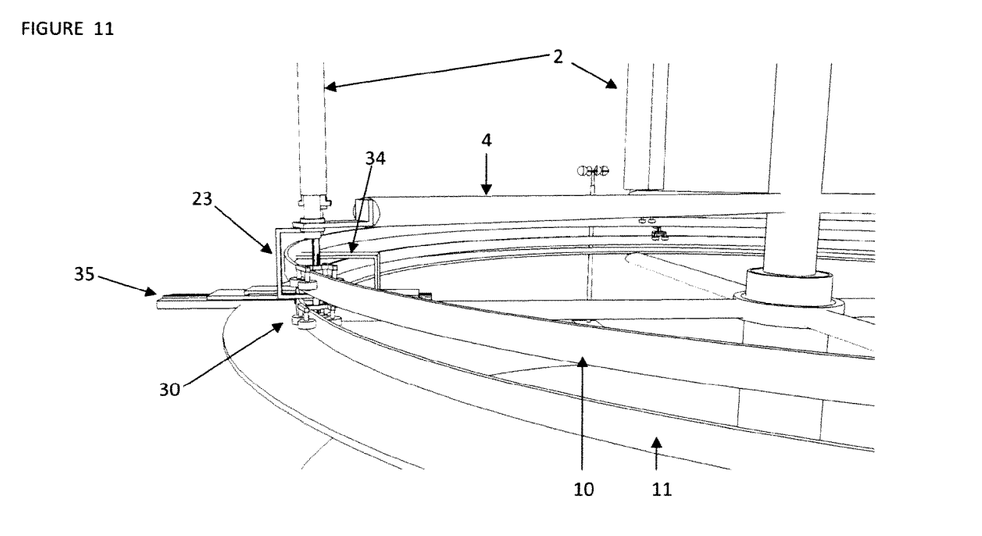
FIG. 11 is a detailed view of an offset guide rail fixing with linear actuators to allow the pitch and camber guide rails to move in one axis.
Figure 12:
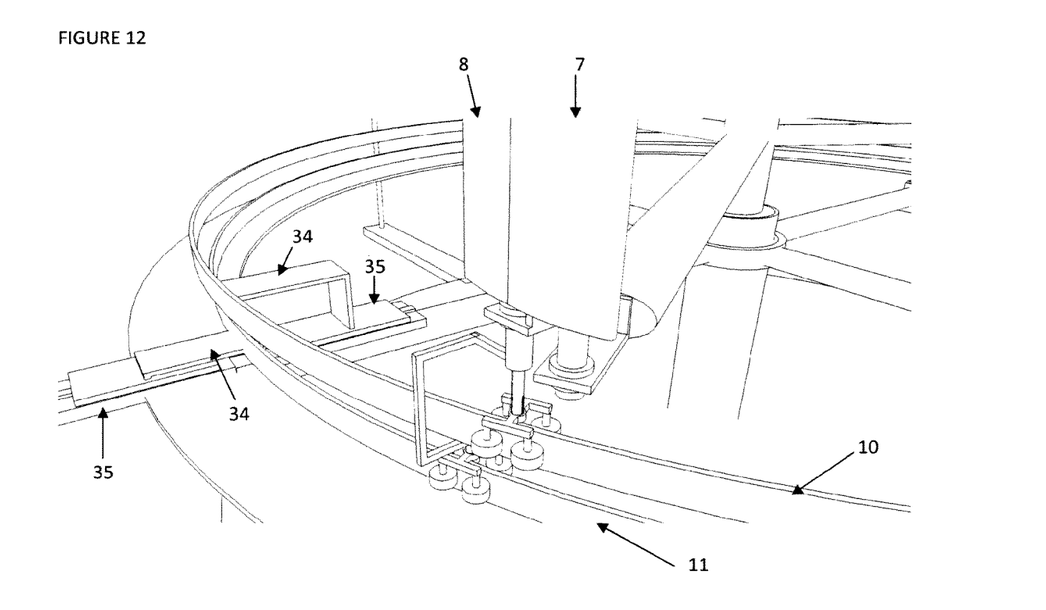
FIG. 12 is an alternative close-up view of the arrangements shown in FIG. 11.

As shown in FIG. 9, the guide rails 10, 11 and blades 2 are arranged on a yaw mechanism 31 to rotate the mechanism as the direction of incident wind changes. The yaw mechanism 31 comprises a circular plate 32 rotatably coupled to the base of the turbine. The plate 32 has a yaw vane 33 so as to align the vane with incident wind. Fixings 34 are placed on the plate on which the guide rails are located as can be seen from FIG. 10.

In an alternative embodiment of the invention, as shown in FIGS. 11 to 15, the guide rail fixings are located on linear actuators 35 which can controllably move the pitch and camber guide rails 10, 11. The linear actuators 35 can be used to controllably move the pitch and camber rails and thereby adjust the pitch and camber for different conditions. The linear actuators can be used to optimise the speed, as the speed of rotation increases the apparent wind and therefore pitch needs to change, and camber can be optimised for wind speed. In low wind conditions this would be to maximise speed of rotation.

Figure 13:
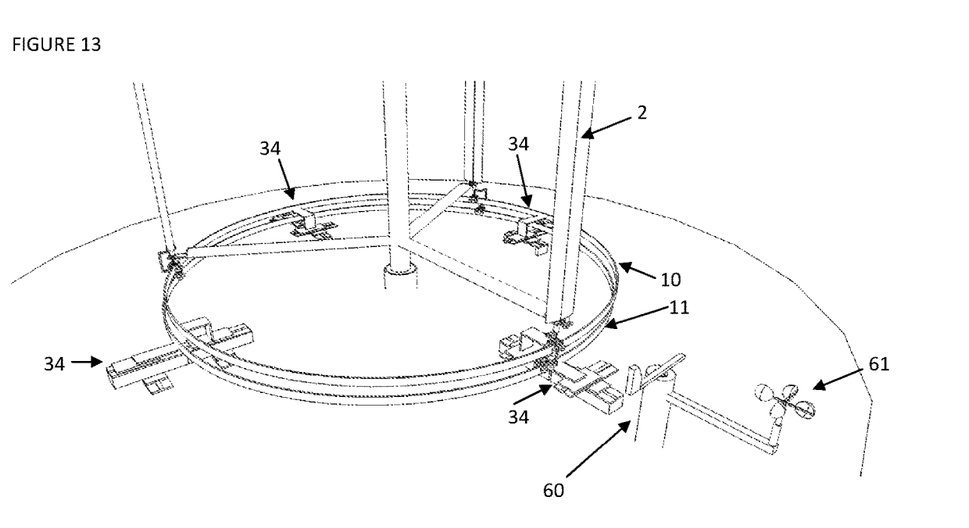
FIG. 13 is an alternative arrangement of guide rail linear actuators in which a yaw vane mechanism is not required.
Figure 14:
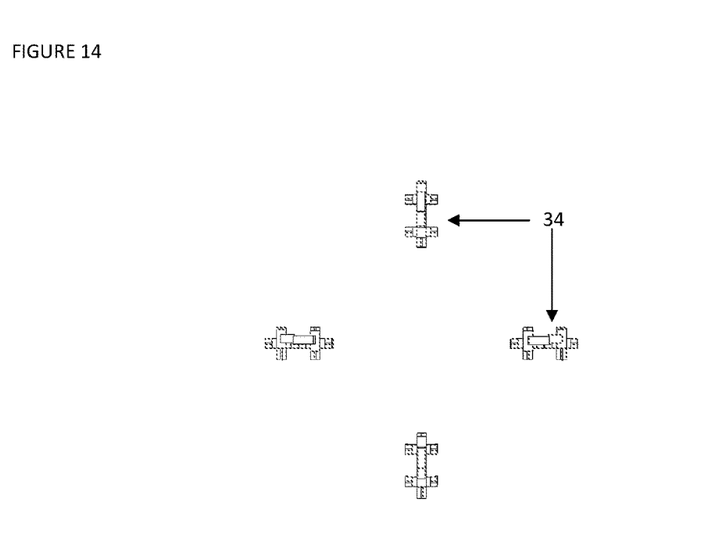
FIG. 14 is a top plan view showing the location of the linear actuators of the embodiments of FIG. 13.
Figure 15:
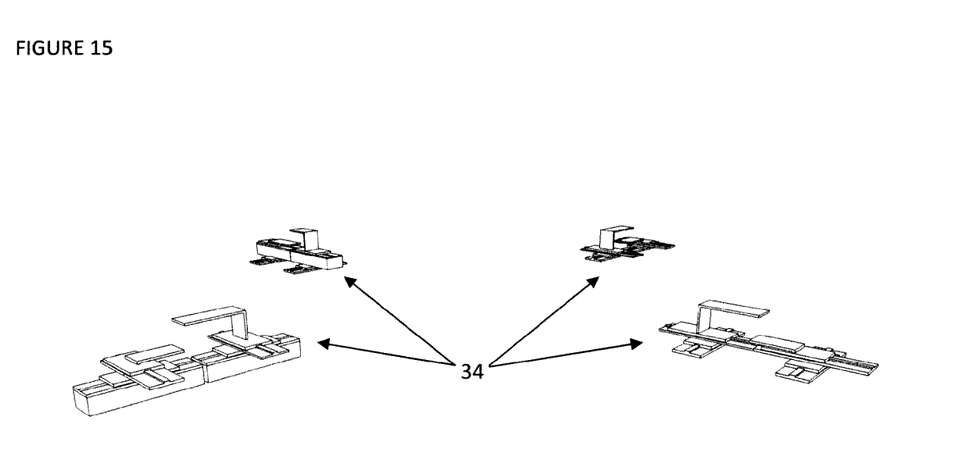
FIG. 15 is a side view of the linear actuator arrangement of FIG. 14.
Figure 16:
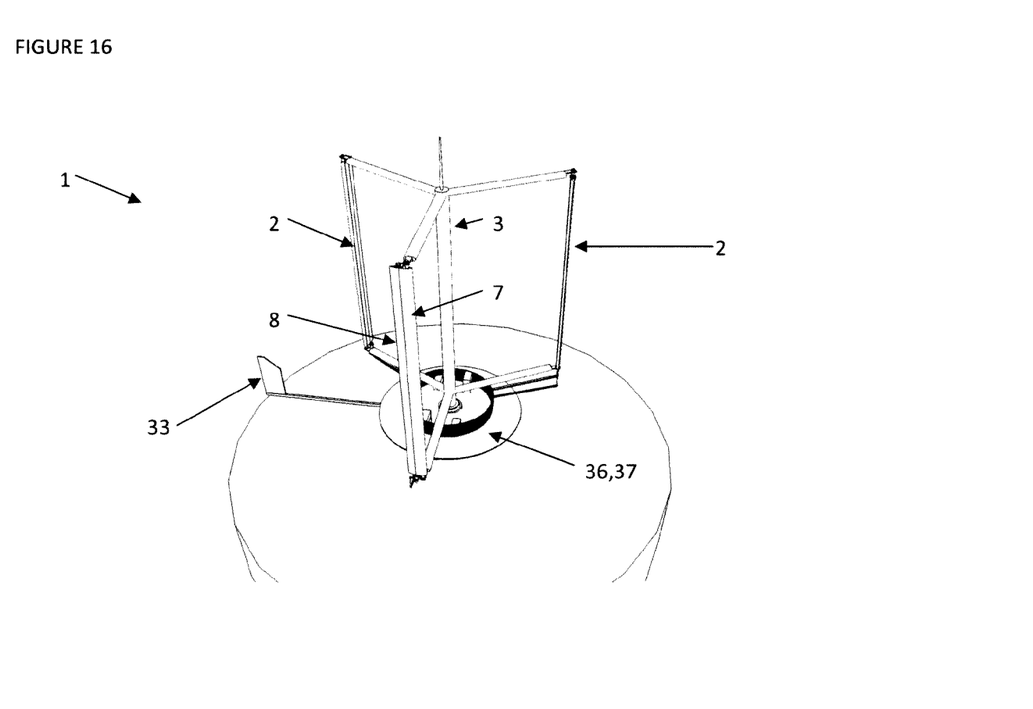
FIG. 16 illustrates a second embodiment of the invention with three adjustable blades and six offset eccentric bearings.

The embodiment shown in FIG. 13 includes a wind direction vane 60 and anemometer 61. The wind direction and speed sensed by these are used to control the linear actuators 35.

As wind turbines or generators also have optimum operating ranges it may be that the speed needs to be reduced in strong wind conditions, and this can be achieved by changing the pitch and/or camber.

In extreme wind conditions it is also possible to stop or stall the turbine by moving the pitch and camber offset to points on the other side of the radius of the pitch pivot.

In an alternative embodiment of the invention illustrated in FIGS. 16, 17, 18 and 19, the circular pitch and camber guide rails are replaced with individual and separate pitch and camber control arrangements for each blade 2. Each control comprises an offset eccentric bearing 36 and a push rod 39 connected to the pivot rod construction. The remainder of its construction is similar to the construction described above in connection with FIGS. 12 and 15. Either a pitch pivot point 40 on the leading blade portion 7 or a camber pivot point 41 on trailing blade portion 8 of a repetitive blade. The vertical axis turbine 1 comprises three turbine blades 2 which rotate around a central vertical rod 3 defining a vertical axis. This vertical rod is coupled to the turbine blades by pairs of arms 4 which connect to the tops and bottoms of each turbine blade. The horizontal support arms 4 are rigidly connected to the central support rod 3 and the central support rod can rotate about a support at its base. The central support rod, horizontal support arms and blades together form the rotor of the vertical axis wind turbine.

Figure 17:
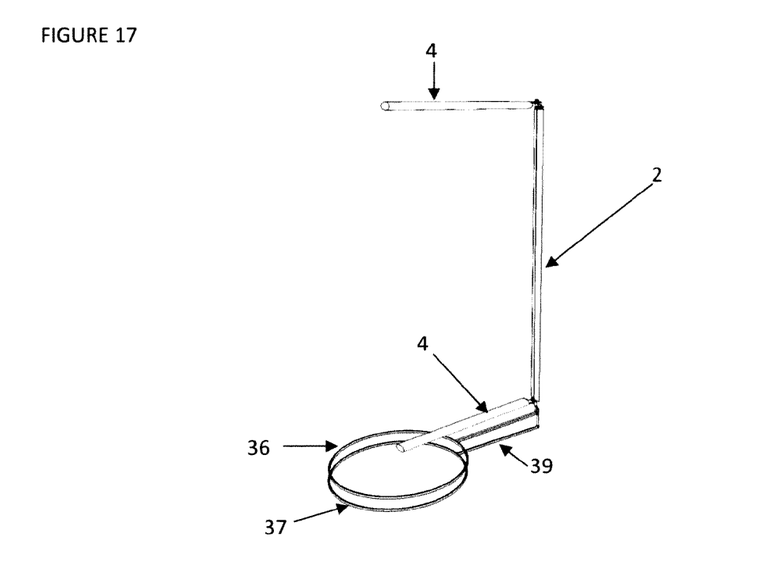
FIG. 17 illustrates the construction of the blade, eccentric bearings and pushrods of the embodiment of FIG. 16.
Figure 18:
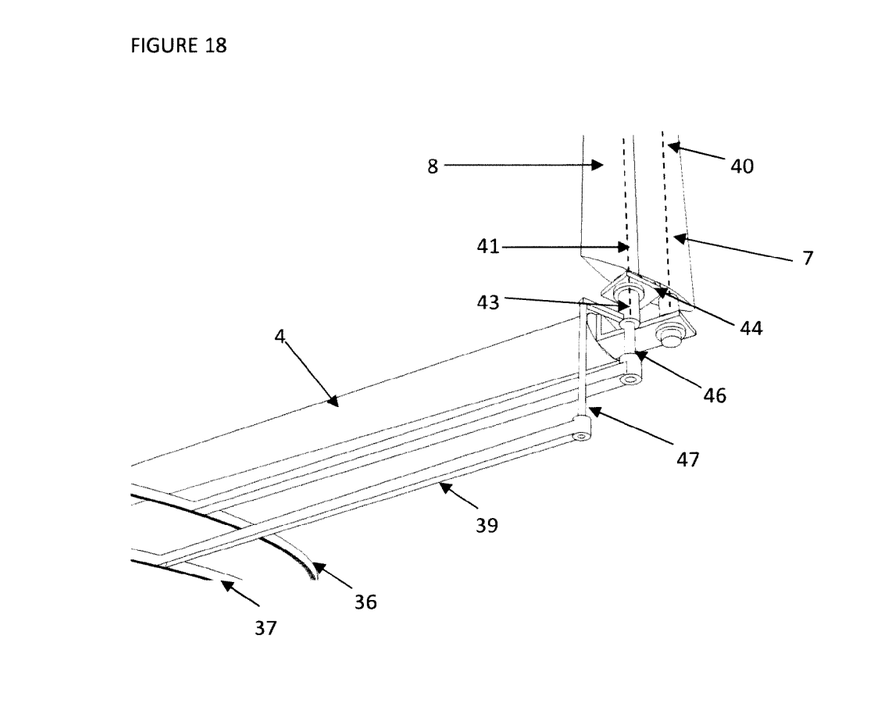
FIG. 18 is a bottom close-up view of the blade, bearings and pushrods of the embodiment of FIG. 16.
Figure 19:
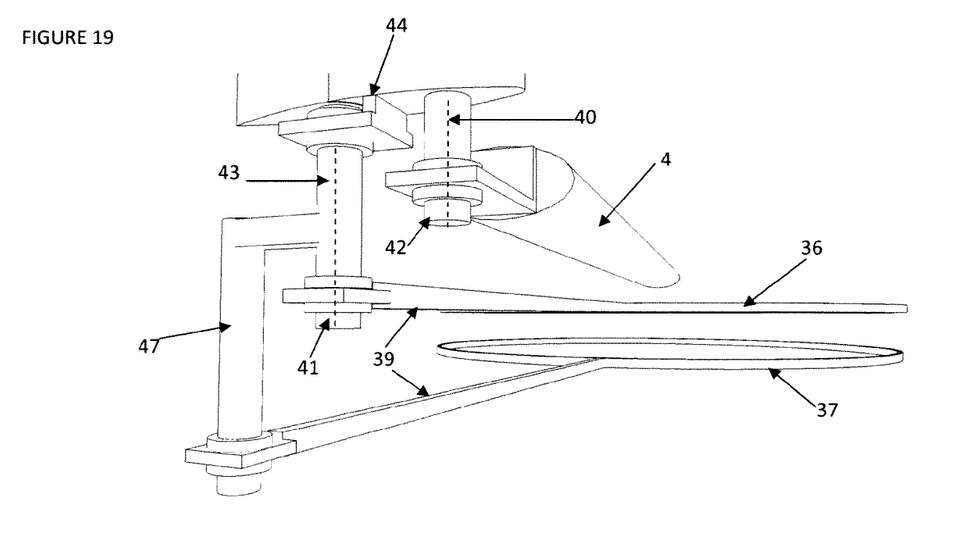
FIG. 19 is a side close-up view of the blade, eccentric bearings and pushrods of the embodiment of FIG. 16.

Referring to FIGS. 17, 18 and 19 the leading blade portion 7 is coupled at its top and bottom ends by repetitive bearing arrangements 42 to the horizontal blade support arms 4. The trailing blade portion is arranged so that it can rotate relative to the leading blade portion 7.

A rod 43 passes through the front of the trailing blade portion 8 from top to bottom. The upper end of this rod 43 is coupled via a bearing (not shown) to the front or leading blade portion, and at its bottom end is coupled via a bearing 44 to the front or leading blade portion 7. The bottom of the rod 43 is coupled via rod 46 and a bearing to a rod 39 that rigidly connects to the eccentric bearing 36 that controls the pitch of the blade. An L-shaped arm 47 rigidly connects to the rod 43 of the trailing blade portion horizontally in the direction of the tail of the trailing blade portion, this is coupled via a bearing to the push rod of the second eccentric bearing 37 that controls the camber of the blade.

Figure 20:
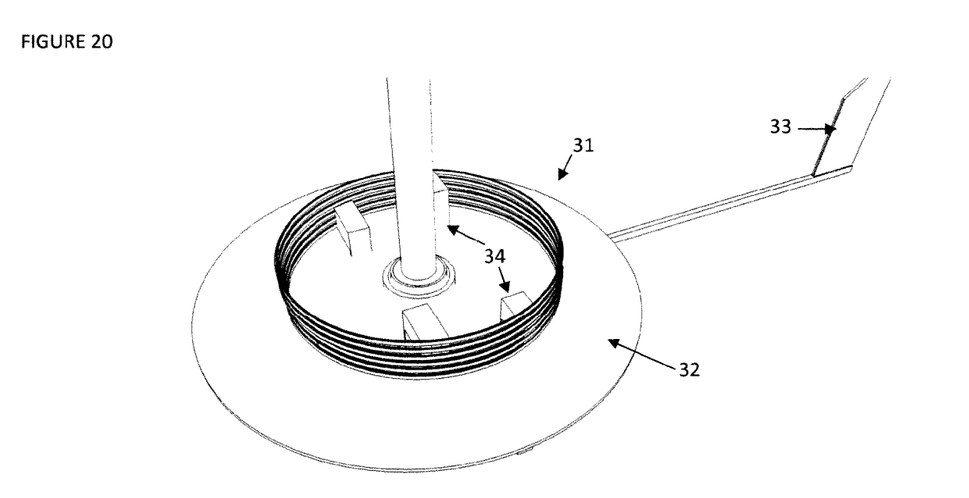
FIG. 20 is an illustration of the fixing of an eccentric bearing to a yaw mechanism in the embodiment of FIG. 16.
Figure 21:
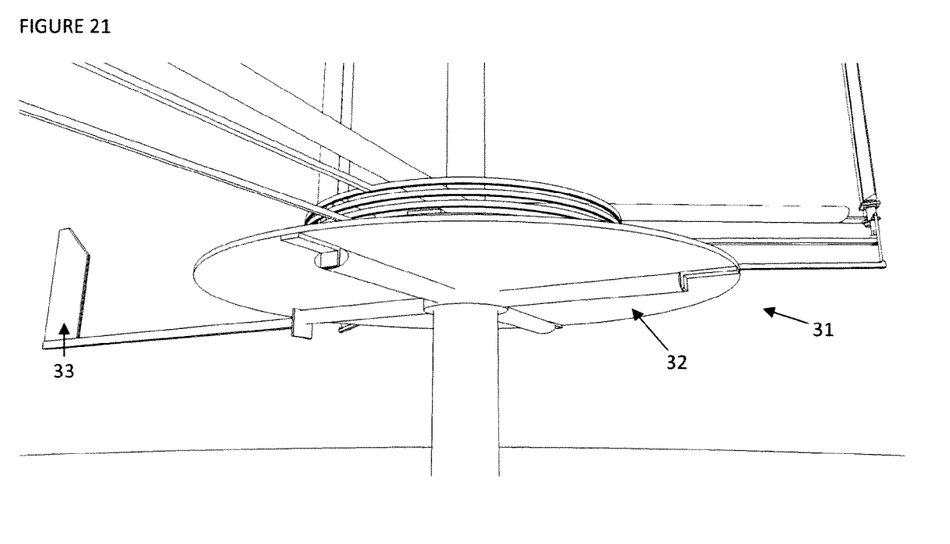
FIG. 21 is a view of the yaw mechanism of FIG. 20 from underneath.
Figure 22:
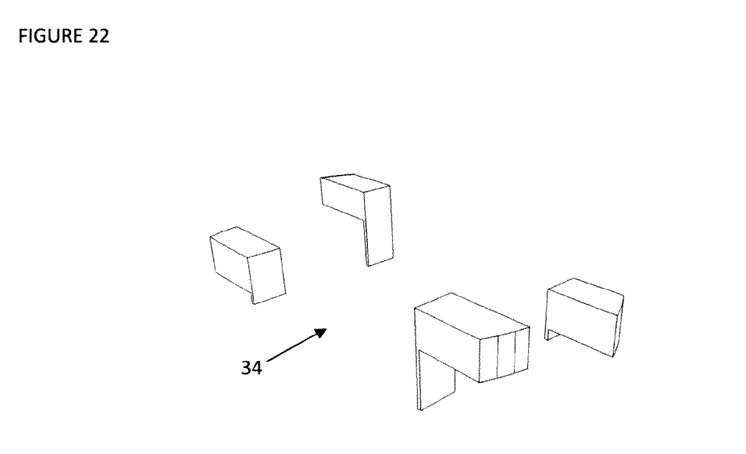
FIG. 22 illustrates the location of the eccentric bearing fixings of the embodiment of FIG. 16.

Referring to FIGS. 20, 21 and 22 the eccentric bearings are arranged on a yaw mechanism 31 to rotate the mechanism as the direction of incident wind changes. The yaw mechanism comprises a circular plate 32 rotatably coupled to the base of the turbine. The plate has a yaw vane 33 so as to align the vane with incident wind. Fixings 34 are placed on the plate on which the eccentric bearings are located.

Figure 23:
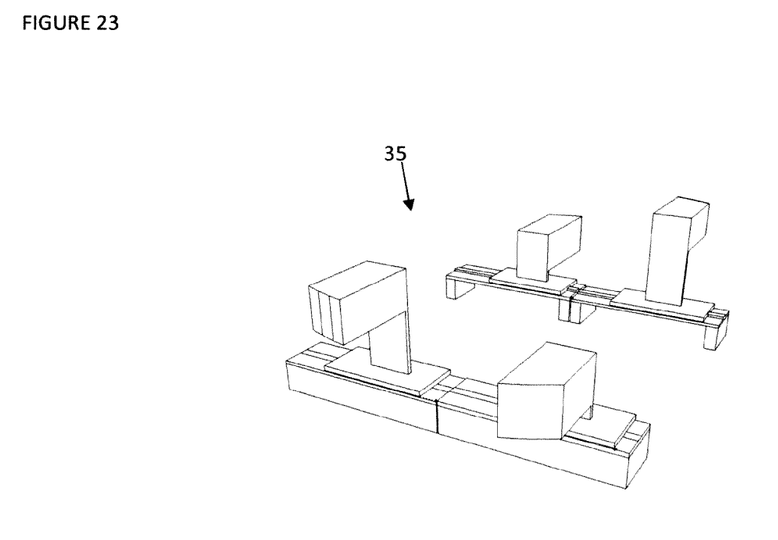
FIG. 23 illustrates eccentric bearing fixings of the embodiment of FIG. 16 with linear actuators to allow the pitch and camber eccentric bearings to move in one axis.

Referring to FIG. 23 in an alternative embodiment of the invention, the eccentric bearings are located on linear actuators 35 which can controllably move the pitch and camber eccentric bearings in one axis.

Figure 24:
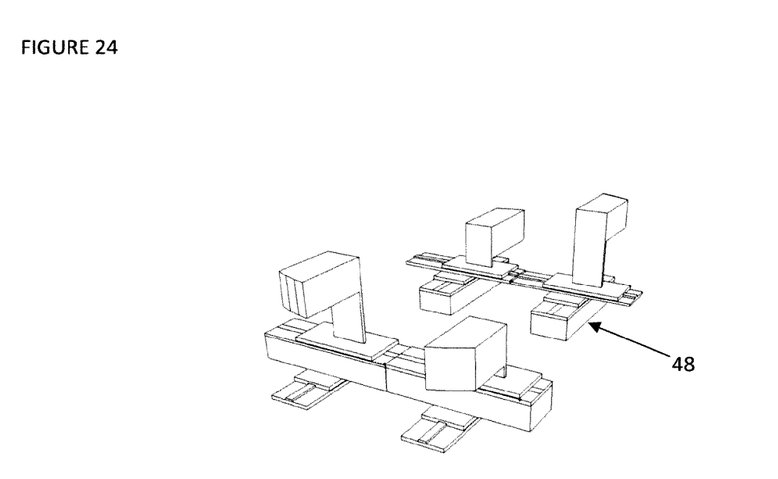
FIG. 24 is an alternative eccentric bearing fixing arrangement in which a yaw vane mechanism is not required.

Referring to FIG. 24 in an alternative embodiment of the invention, the eccentric bearings are located on linear actuators 48 which can controllably move the pitch and camber eccentric bearings in two axes and so replace the need for a rotating yaw vane mechanism.

Figure 25:
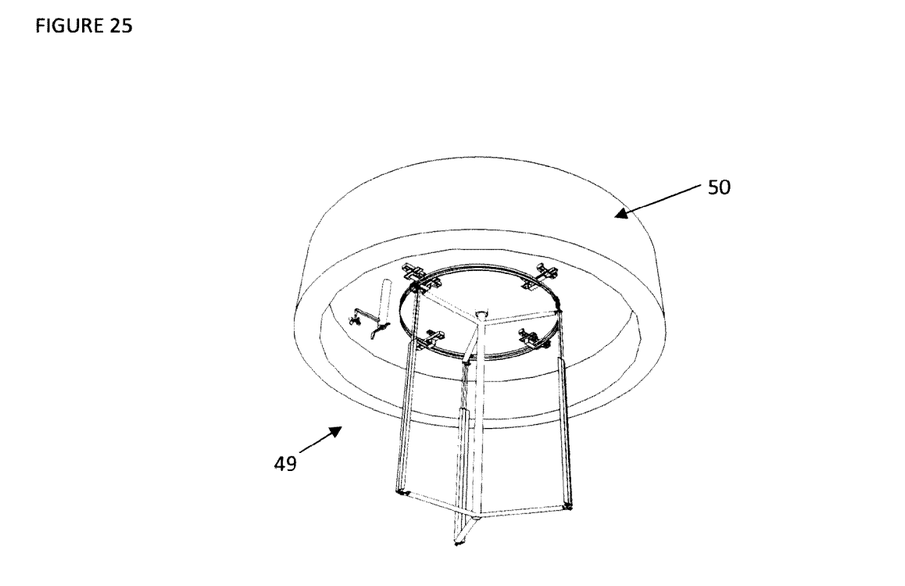
FIG. 25 illustrates an alternative embodiment of the invention for use as a tidal turbine.
Figure 26:
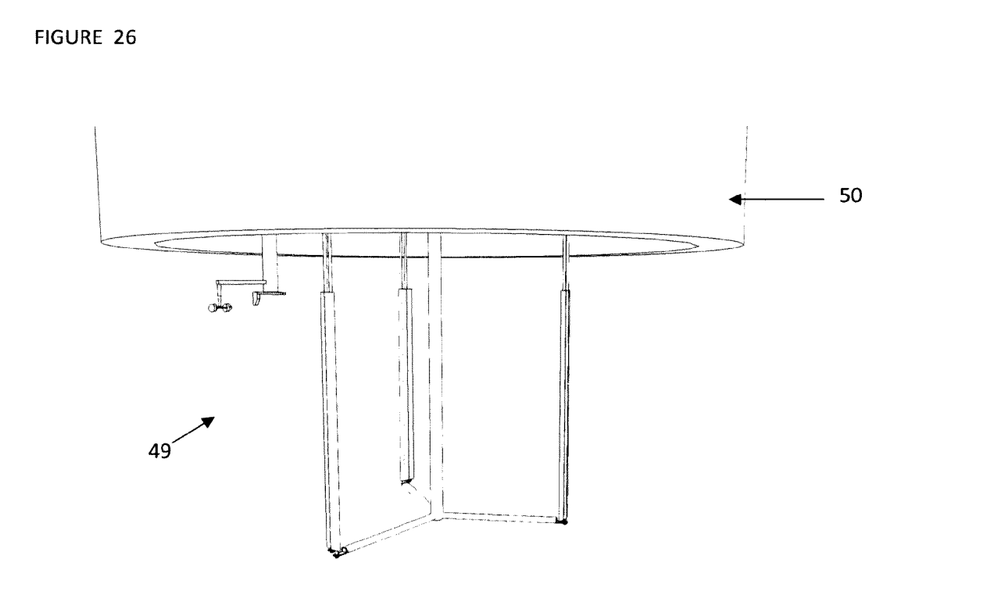
FIG. 26 is a side view of the embodiment of FIG. 25.

Referring to FIGS. 25 and 26, the vertical axis turbine has been arranged with a water float 50 so as to be suitable as a floating water turbine 49. The connecting rod at the top of the blade has been extended so that the top horizontal support arms and control guide rails and linear actuators are not in contact with the water. The construction of the turbine is otherwise the same as described for the embodiments shown in FIGS. 1 to 23 but inverted or upside down.

Embodiments of the invention are suitable for extracting energy from any moving fluid. Suitable fluids and environments include, but are not limited to, moving air or wind, and tides.

The embodiments of the invention described above with reference to FIGS. 1 to 26 all have a turbine rotor axis of rotation which is substantially vertical. The invention is, however, equally applicable for use in situations where the rotor axis of rotation is not vertical: for example, in a cyclogiro or in a shallow water tidal current device in which the axis of rotation would be substantially horizontal. The skilled man would readily appreciate that the construction of such a turbine would be similar to that described above in connection with FIGS. 1 to 26.

The invention claimed is:

1. A turbine comprising a turbine rotor having an axis of rotation and at least one blade spaced from and mounted for rotation about the rotation axis of the turbine, the blade having at least one longitudinal surface substantially parallel to the rotation axis and for engagement, in use, with fluid incident on the turbine rotor, and the blade being a two part blade with a first leading blade portion pivotably connected to a second trailing blade portion, the turbine further comprising active pitch control means and active camber control means for controlling the pitch and camber of the blade, the active pitch control means comprising a pitch pivot on the first leading blade portion, the pitch pivot being guidable along a pitch path defined by a pitch control component, and the active camber control means comprising a camber pivot on the second trailing blade portion, the camber pivot being guidable around a defined camber path defined by a camber control component, the pitch control component being either a pitch control rail or a pitch bearing, and the camber control component being either a camber control rail or a camber bearing.

2. The turbine according to claim 1 wherein the pitch and camber paths are each substantially circular.

3. The turbine according to claim 2 wherein one or more of the pitch path and camber path define a substantially circular path, and the centres of the circular paths are offset from each other and from the axis of rotation of the turbine.

4. The turbine according to claim 1 wherein the pitch path is defined by the distal end of a pitch rod linked to the pitch bearing which rotates about a pitch axis offset from the turbine's axis of rotation, and the camber path is defined by the distal end of a camber rod linked to the camber bearing which rotates about camber axis offset from the turbine's axis of rotation, the distal ends of the pitch rod and camber rod being pivotably coupled to, respectively, the pitch pivot and the camber pivot.

5. The turbine according to claim 4 wherein the pitch and camber pivots of the turbine blade are coupled separately to the pitch rod and the camber rod respectively, and each of the pitch rod and the camber rod is coupled to a separate pitch bearing or a camber bearing, respectively.

6. The turbine according to claim 4 comprising at least two turbine blades, each turbine blade having a respective pitch rod and a respective camber rod and wherein the pitch and camber pivots of each turbine blade are each coupled to the respective pitch rods and the respective camber rod, each pitch rod being coupled to a pitch bearing an each camber rod being coupled to a camber bearing.

7. The turbine according to claim 1 wherein the pitch path is defined by a first pitch guide rail, and the camber path is defined by a second camber guide rail.

8. The turbine according to claim 7 comprising at least two blades and wherein the pitch and camber pivots of said at least two blades are each coupled to, respectively, a single pitch and a single camber guide rail.

9. The turbine according to claim 1 wherein one of the pitch or camber path is defined by the distal end of a pitch rod or a camber rod respectively, linked to a bearing which rotates about a pitch axis or a camber axis respectively, which is offset from the turbine's axis of rotation, the distal end of the pitch rod or the camber rod being pivotably coupled to either the pitch pivot or the camber pivot respectively, and wherein the other of the pitch or camber path is defined by a pitch guide rail or a camber guide rail respectively.

10. The turbine according to claim 9 wherein, in use, the position of one or more of the pitch and camber bearings, or one or more of the pitch and camber guide rail is fixed.

11. The turbine according to claim 9 wherein the position of one or more of the pitch and camber bearings, or one or more of the pitch and camber guide rail is controllably adjustable.

12. The turbine according to claim 11 wherein the position of one or more of the pitch and camber bearings, or one or more of the pitch and camber guide rail is controlled by linear actuators.

13. The turbine according to claim 11 wherein adjustment is possible in one or two axes.

14. The turbine according to claim 1 wherein each blade portion includes first and second opposing transverse surfaces substantially transverse to the blade longitudinal axis and wherein one of the leading blade portion or trailing blade portion includes first and second pivot rods projecting from, respectively, the first and second transverse surfaces of the leading blade portion or trailing blade portion, the first pivot rod being coupled to one of either the leading blade portion or trailing blade portion to form one of the pitch or camber pivots and the second pivot rod being coupled to either a follower mechanism which is arranged to follow one of a pitch guide rail or a camber guide rail, or a pitch rod or a camber rod connected to one of the pitch or camber bearings.

15. The turbine according to claim 14 wherein the first pivot rod projects from one of the leading blade portion or trailing blade portion and is coupled to the other of the leading blade portion or trailing blade portion.

16. The turbine according to claim 14 wherein the other one of the leading blade portion or trailing blade portion is pivotably coupled to either a follower mechanism which is arranged to follow one of the pitch or camber guide rails, or to the pitch rod or the camber rod connected to one of the pitch or camber bearings.

17. The turbine according to claim 14, wherein one of the leading blade portion or trailing blade portion is coupled by the first pivot rod to either one of the pitch or camber guide rails, or to one of the pitch or camber bearings, and the other one of the leading blade portion and trailing blade portion is pivotably coupled to either a follower mechanism which is arranged to follow the other one of the pitch or camber guide rails, or to the pitch rod or the camber rod connected to one of the pitch or camber bearings.

18. The turbine according to claim 17 wherein the second pivot rod is pivotably connected to the follower mechanism or the pitch rod or the camber rod which is arranged to follow the other one of the pitch or camber guide rails, and the projecting pivot rod forming one of the camber or pitch pivots.

19. The turbine according to claim 18 wherein the first and second pivot rods project from the trailing blade portion and the first pivot rod is connected to the leading blade portion to form the pitch pivot.

20. The turbine according to claim 18 wherein the second pivot rod forms the camber pivot.

21. The turbine according to claim 1, wherein the turbine is a vertical axis wind turbine.

22. The turbine according to claim 14, wherein the first transverse surface and the second transverse surface are, respectively, upper and lower surfaces of the respective blade portions.

23. The turbine according to claim 22 wherein the pitch and camber paths are arranged below the at least one blade.

24. The turbine according to claim 1, wherein the turbine is a vertical axis wave or tidal turbine.

25. The turbine according to claim 14, wherein the turbine is a vertical axis wave or tidal turbine, and wherein the first transverse surface and the second transverse surface are, respectively, lower and upper surfaces of the respective blade portions.

26. The turbine according to claim 22 wherein the pitch and camber paths are arranged above or to the side of the at least one blade.

27. A cyclogiro turbine according to claim 1.

* * * * *